(12) United States Patent
Klassen et al.

(10) Patent No.: US 8,843,569 B2
(45) Date of Patent: *Sep. 23, 2014

(54) MULTI-COMMUNITY INSTANT MESSAGING SYSTEM AND DEVICE

(75) Inventors: Gerhard D. Klassen, Waterloo (CA); Craig A. Dunk, Guelph (CA); Christopher R. Wormald, Kitchener (CA)

(73) Assignee: BlackBerry Limited, Waterloo (CA)

( * ) Notice: Subject to any disclaimer, the term of this patent is extended or adjusted under 35 U.S.C. 154(b) by 588 days.

This patent is subject to a terminal disclaimer.

(21) Appl. No.: 12/813,331

(22) Filed: Jun. 10, 2010

(65) Prior Publication Data

US 2010/0250694 A1 Sep. 30, 2010

Related U.S. Application Data

(63) Continuation of application No. 12/471,718, filed on May 26, 2009, which is a continuation of application No. 10/730,682, filed on Dec. 8, 2003, now Pat. No. 7,555,522.

(51) Int. Cl.
*G06F 15/16* (2006.01)
*G06F 15/177* (2006.01)
*G06F 15/173* (2006.01)
*H04L 12/58* (2006.01)
*H04L 29/06* (2006.01)

(52) U.S. Cl.
CPC .............. *H04L 12/581* (2013.01); *H04L 51/04* (2013.01); *H04L 12/5835* (2013.01); *H04L 51/066* (2013.01); *H04L 69/18* (2013.01); *H04L 12/5895* (2013.01)
USPC .......................... 709/206; 709/223; 345/440

(58) Field of Classification Search
CPC ... H04L 12/581; H04L 12/5835; H04L 51/04; H04L 51/066; H04L 69/18; H04L 12/5895
USPC ........... 709/206, 201–205, 217–229; 345/440
See application file for complete search history.

(56) References Cited

U.S. PATENT DOCUMENTS

| | | | |
|---|---|---|---|
| 6,549,937 B1 | 4/2003 | Auerbach et al. | |
| 7,555,522 B2 * | 6/2009 | Klassen et al. ................ | 709/206 |
| 2001/0013050 A1 * | 8/2001 | Shah .............................. | 709/202 |
| 2002/0178231 A1 | 11/2002 | Matsa et al. | |
| 2003/0140103 A1 | 7/2003 | Szeto et al. | |
| 2003/0187800 A1 * | 10/2003 | Moore et al. .................... | 705/52 |
| 2003/0236831 A1 | 12/2003 | Ortiz et al. | |
| 2004/0017396 A1 | 1/2004 | Werndorfer et al. | |
| 2004/0049589 A1 | 3/2004 | Papanikolaou et al. | |
| 2004/0113938 A1 | 6/2004 | Akerfeldt | |
| 2004/0122693 A1 | 6/2004 | Hatscher et al. | |

(Continued)

OTHER PUBLICATIONS

EPO: European Search Report issued Jun. 3, 2004, Application No. 03028176.0-1244 (9 pages).

(Continued)

*Primary Examiner* — Haresh N Patel
(74) *Attorney, Agent, or Firm* — Jones Day

(57) ABSTRACT

This relates to a method of operating a mobile device. The method includes providing groups data comprising information for each of a plurality of instant messaging services operable on the mobile device. The groups data is stored in a database and used with a multi-community service.

20 Claims, 3 Drawing Sheets

(56) References Cited

U.S. PATENT DOCUMENTS

| | | |
|---|---|---|
| 2004/0254976 A1 | 12/2004 | Malik et al. |
| 2004/0254991 A1 | 12/2004 | Malik et al. |
| 2005/0021782 A1 | 1/2005 | Malik et al. |
| 2005/0050151 A1 | 3/2005 | Mitchell et al. |
| 2007/0120856 A1 | 5/2007 | De Ruyter et al. |

OTHER PUBLICATIONS

USPTO: Office Action issued Apr. 15, 2010, U.S. Appl. No. 12/471,718 (5 pages).

* cited by examiner

MULTI-COMMUNITY INSTANT MESSAGING SYSTEM AND DEVICE

CROSS-REFERENCE TO RELATED APPLICATION

This is a continuation of U.S. Patent Application No. (now U.S. Pat. No. 7,962,559) filed May 26, 2009, which is a continuation of U.S. patent application Ser. No. 10/730,682 filed Dec. 8, 2003 (now U.S. Pat. No. 7,555,522), both applications hereby incorporated herein by reference.

TECHNICAL FIELD

This patent application relates generally to techniques for instant messaging. More particularly, the technology described herein provides a multi-community instant messaging system and device in which a common instant messaging application operating on the device can be used to communicate with a plurality of instant messaging communities.

BACKGROUND

Numerous instant messaging services are currently available, such as AIM and ICQ from America Online, Yahoo Messenger from Yahoo, and MSN from Microsoft. Each of these Instant Messaging services provide a community of users with the ability to send and receive instant messages to one another. Using these instant messaging services on mobile devices has been problematic. One solution is to provide a separate instant messaging application for each of the services on the mobile device. This is problematic, however, because mobile devices typically have limited fixed memory resources, and having four separate instant messaging applications drains a great deal of the available device memory. Another solution has been to provide a single, generic application and single user interface that connects to the various Instant Messaging services through a separate gateway for each service. This solution is also problematic, however, because it sacrifices the full range of functionality and unique interface attributes for any of the particular instant messaging services.

Instant messaging services exchange messages and state information (also referred to as presence information) between users logged into the instant messaging community. Each user typically receives state information from only a subset of users that they are interested in communicating with. In ICQ, for example, the presence information of a select group of other ICQ clients is typically maintained in a "buddy list," so that when the user of an ICQ client consults the list, the user knows if any of the corresponding users in the "buddy list" are available for instant messaging, or if they are not. Presence information in ICQ is defined using states such as connected, chatty, away, extended away, occupied, do not disturb, invisible, and offline. The other exemplary instant messaging applications mentioned above use different terms to describe the buddy list and presence states, and may also provide a different set of functions and distant user interface attributes.

SUMMARY

A multi-community instant messaging system, device and method are provided. The system includes a plurality of instant messaging communities, a network, and at least one mobile instant messaging device. The mobile instant messaging device provides a user interface for displaying a plurality community-specific icons, each community-specific icon providing an identification of one of the instant message communities. The mobile device also provides a plurality of configuration data files are stored on the device, each configuration data file being associated with one of the community-specific icons, and a common instant messaging application. Upon selecting one of the community-specific icons, the common instant messaging application is configured for use as a community-specific instant messaging application using the associated configuration data file, and may communicate instant messages over the network to the selected instant messaging community.

DETAILED DESCRIPTION OF THE DRAWINGS

Figure 1:
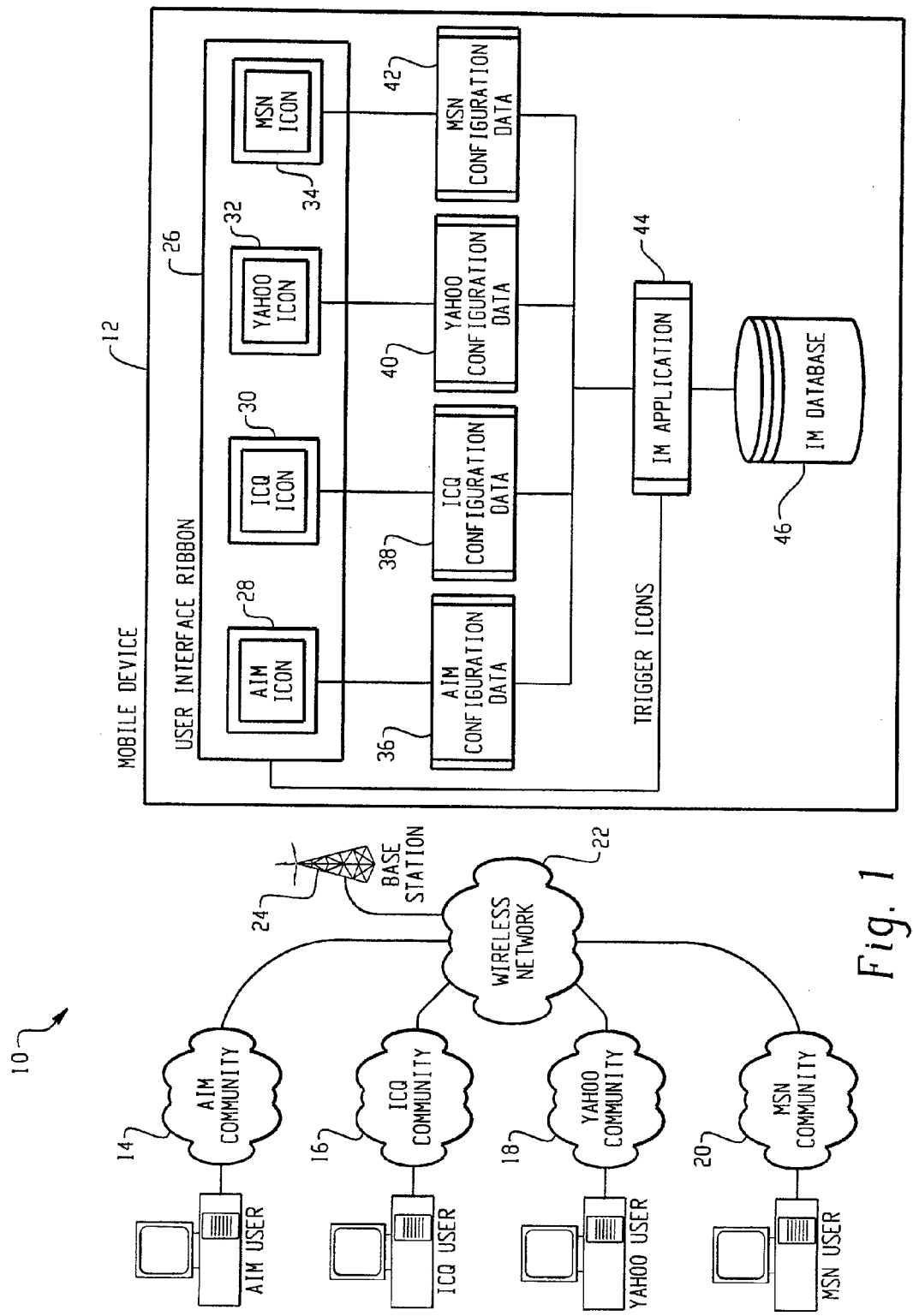
FIG. 1 is a system diagram of a multi-community instant messaging system and device.

FIG. 1 is a system diagram of a multi-community instant messaging system 10 and device 12. The exemplary system 10 includes a plurality of instant messaging communities 14, 16, 18, 20, with corresponding users of those communities, a wireless network 22 having one or more base stations 24, and one or more wireless mobile devices 12. Although this exemplary system is shown as having a wireless interface between the instant messaging communities 14, 16, 18, 20 and the mobile device 12, alternatively the system could be implemented entirely in a wired environment.

The users of the various instant messaging communities are depicted by the computers on the left-hand portion of the Figure. In practice, of course, there would be a multitude of users for each community, and these users could connect to the community through a variety of networks, connections, etc., such as by wired connections through the Internet or a local or wide area network, through wireless communications, such as cellular networks or satellite networks, over cable lines, or through direct TV satellite links, to name but a few.

Each of the instant messaging communities 14, 16, 18, 20 in this exemplary system 10 are depicted as being connected to the wireless network 22. Although a direct link is shown in FIG. 1, there could be other intermediate systems and networks coupled between the wireless network 22 and the various instant messaging communities 14, 16, 18, 20.

The mobile device 12 is preferably a wireless mobile device, such as a two-way pager, cellular telephone with data messaging capabilities, wireless Personal Digital Assistant, or the like, but could also be a device that lacks a wireless interface. An exemplary wireless mobile device is depicted (and discussed below) with reference to FIG. 3.

The wireless mobile device 12 preferably includes a user interface ribbon 26 for displaying program icons on a display of the device. A user interface ribbon may be a one or two dimensional graphical depiction of a set of icons. The icons represent applications that may be executed by a processor of the mobile device 12. For a one-dimensional ribbon there is a linear display of the available icons, which may be in a horizontal or vertical orientation on the display of the mobile device. For a two-dimensional ribbon there is a square or rectangular grid of icons. Furthermore, the icons displayed by the user interface ribbon may be organized and displayed in a hierarchical structure such that certain root icons lead to other sets of icons, and so forth, in a hierarchical manner.

For each of the instant messaging communities 14, 16, 18, 20, there is preferably a separate and distinct-looking icon displayed on the user interface ribbon 26. For example, in the exemplary system of FIG. 1 having four instant messaging communities 14, 16, 18, 20, there is preferably four community-specific icons 28, 30, 32 and 34 that may be displayed on the user interface ribbon 26. Each of these icons is preferably distinct from the others and provides information to the user of the device as to which community it represents. For example, the AIM icon 28 may include the letters "A", "I", and "M" in the graphical depiction so that a user of the mobile device knows that this icon represents the AIM instant messaging community. Alternatively, the icons my use graphic art that is associated with the particular instant messaging community to convey to the user the identity of the community accessible via the particular icon. Although the mobile device 12 may display a plurality of icons 28, 30, 32, 34 for instant messaging services, each of these icons results in the configuration and execution of a common underlying application program 44, as discussed in more detail below.

In addition to identifying a particular instant messaging service, the community-specific icons 28, 30, 32, 34 may be configured to display instant messaging information to the user of the device. For example, the current presence (or state) information for the user may be displayed (either textually or graphically) along with the icon. In addition, current messaging information may be displayed (either textually or graphically) to indicate, for example, a number of received messages or communications. Other types of information particular to the various instant messaging services may also be displayed along with the icon in order to provide the user with additional information that may effect the user's decision as to whether the instant messaging application 44 should be executed for the service identified by the icon.

When a user of the mobile device 10 selects one of the available instant messaging icons 28, 30, 32, 34 on the user interface ribbon 26, the common, underlying instant messaging application program 44 is executed by the device's processor. Unlike the known single application systems, however, the instant messaging application 44 is configured for the particular instant messaging community specified by the selected icon using a community-specific configuration data file. This data file 36, 38, 40, 42 includes information regarding the appearance, lexicon, and functionality of the particular community that is used to configure the instant messaging application 44 for that particular community. Thus, for example, if certain terminology is used in AIM to describe the contact list, or login procedure, or state information, etc., which is distinct to this particular instant messaging service, then the configuration file 36 will provide this terminology to the instant messaging application 44 so that the user experience is consistent with the user of an AIM-specific instant messaging application. Similarly, the graphical appearance of the user interface for the AIM-specific application and its functionality are duplicated by the single, underlying IM application 44 using the data from the configuration data file. For each of the other available instant messaging icons 30, 32, 34, a similar configuration data file 38, 40, 42 will cause the same underlying instant messaging application 44 to be configured to operate and appear like a specific application for those instant messaging services.

The database 46 stores information for each of the one or more instant messaging services 14, 16, 18, 20 operable on the mobile device 12. Although depicted as a single database 46, this data may be stored in one or more databases. The data stored in this database may include presence information for the user and also user-specific data for each of the instant messaging services, such as buddy-lists, groups, stored communications, etc.

Although in one embodiment the various instant messaging icons 28, 30, 32, 34 may be continuously displayed on the user interface ribbon 26, in the example shown in FIG. 1 (and as further described with respect to FIG. 2), the display of a particular icon is triggered by the instant messaging application 44. As discussed below, the instant messaging application may be configured to monitor one or more triggering events that cause a particular instant messaging icon to be displayed and then subsequently cause the configuration and execution of the single instant messaging application 44 for that particular service. Although there is preferably just one instant messaging application 44, it can be executed by the mobile device 12 more than once if the user has selected more than one of the icons 28, 30, 32, 34, so that the user can simultaneously communicate with the various instant messaging services 14, 16, 18, 20.

Figure 2:
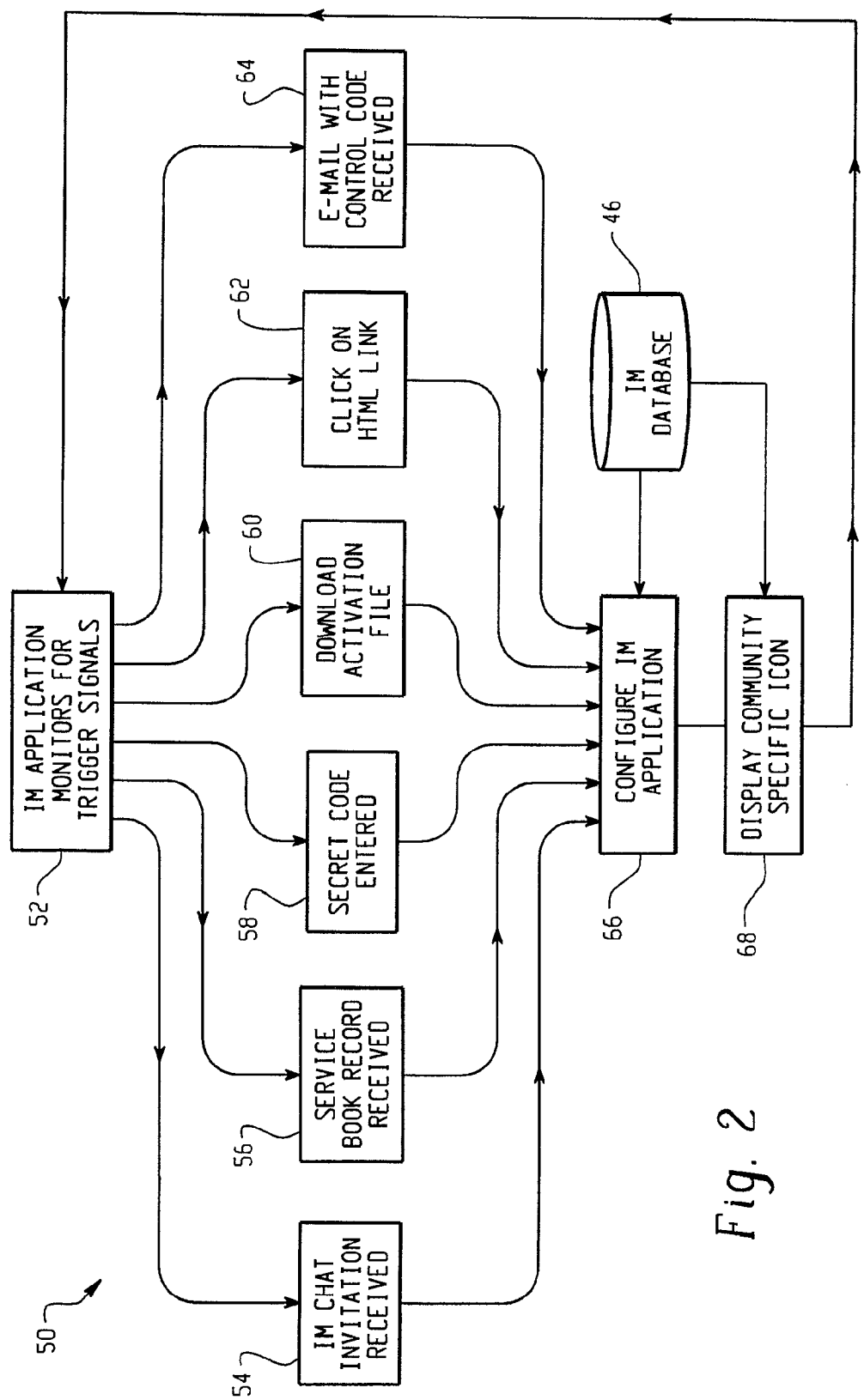
FIG. 2 is a flow diagram showing triggering events for community-specific icons in the device shown in FIG. 1.

FIG. 2 is a flow diagram showing triggering events for community-specific icons in the device shown in FIG. 1. At step 52, the instant messaging application monitors for a variety of possible trigger signals. These trigger signals may include: (1) receiving an invitation to chat (step 54); (2) receiving a service book record that identifies a particular service accessible through one of the instant messaging services (step 56); (3) entering of secret code by the user, or as received from another system or user (step 58); (4) activation of a download file (step 60); (5) clicking on an HTML (or other type of) link in a browser or other information service (step 62); or (6) receiving an e-mail (or other type of message) with a control code for activating a particular service or session to another instant messaging user (step 64). Other trigger signals may also be monitored. After detecting one of the trigger signals 54, 56, 58, 60, 62, etc., a particular one (or more) of the instant messaging services 14, 16, 18, 20 are configured using the appropriate configuration data file 36, 38, 40, 42, the instant messaging application is executed at step 66 for that service, and the community-specific icon for that instant messaging service is then displayed on the user interface ribbon at step 68.

Figure 3:
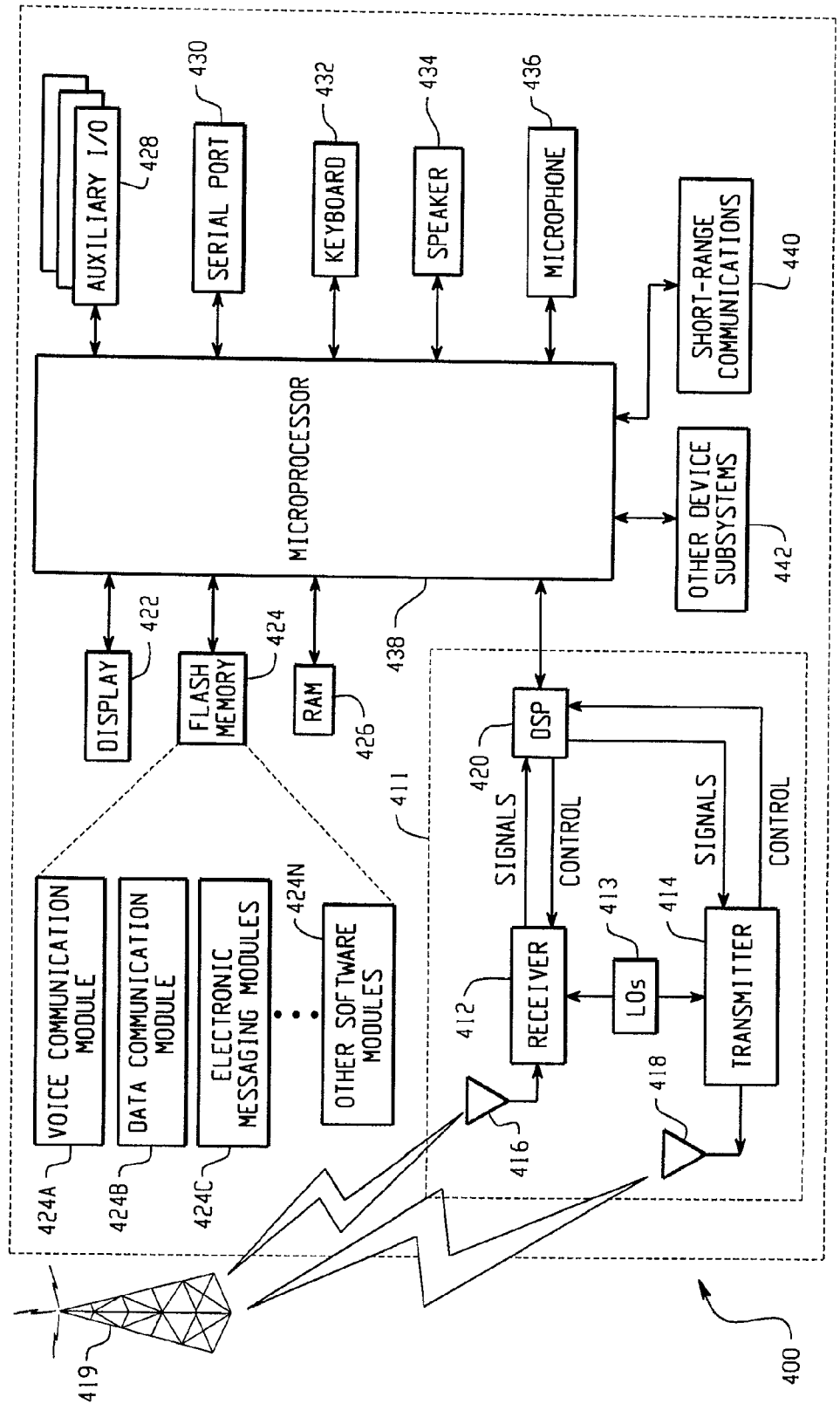
FIG. 3 is a block diagram of an exemplary mobile device for use with the multi-community instant messaging system shown in FIG. 1.

FIG. 3 is a block diagram illustrating an example mobile communication device 400 that may be used in conjunction with the user interface ribbon 26, icons 28, 30, 32, 34, configuration data files 36, 38, 40, 42, IM application 44 and IM database 46 shown in FIG. 1. The mobile communication device 400 includes a processing subsystem 438, a communications subsystem 411, a short-range communications subsystem 440, a memory subsystem 424, 426, and various other device subsystems and/or software modules 442. The mobile communication device 400 also includes a user interface, which may include a display 422, a keyboard 430, a speaker 432, a microphone 436, one or more auxiliary input/output devices 428, a serial port 430, and/or other user interface devices.

The processing subsystem 438 controls the overall operation of the mobile communication device 400. Operating system software executed by the processing subsystem 438 may be stored in a persistent store, such as a flash memory 424, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 426. Communication signals received by the mobile communication device 400 may also be stored to RAM 426.

The processing subsystem 438, in addition to its operating system functions, enables execution of software applications 424 on the device 400. A predetermined set of applications that control basic device operations, such as data and voice communications, may be installed on the device 400 during manufacture. For example, a personal information manager (PIM) application, including an electronic messaging application, may be installed on the device. The PIM may, for example, be operable to organize and manage data items, such as email, calendar events, voice mails, appointments, and task items. The PIM application may also be operable to send and receive data items via the wireless network 419. Another application that may be installed on the device is the instant messaging application 44 shown in FIG. 1. These applications operated in conjunction with data stored in the Flash memory 424 or RAM 426. For example, the instant messaging configuration data files 36, 38, 40, 42, instant messaging database 46, and community-specific icon code 28, 30, 32, 34 may be stored in the Flash memory 424.

Communication functions, including data and voice communications, are performed through the communication subsystem 411, and possibly through the short-range communications subsystem 440. The communication subsystem 411 includes a receiver 412, a transmitter 414 and one or more antennas 416, 418. In addition, the communication subsystem 411 also includes a processing module, such as a digital signal processor (DSP) 420 or other processing device(s), and local oscillators (LOs) 413. The specific design and implementation of the communication subsystem 411 is dependent upon the communication network in which the mobile communication device 400 is intended to operate. For example, a mobile communication device 400 may include a communication subsystem 411 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile communication devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile communication device 400 may send and receive communication signals over the communication network 419. Signals received by the antenna 416 from the communication network 419 are routed to the receiver 412, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 419 are processed (e.g., modulated and encoded) by the DSP 420 and are then provided to the transmitter 414 for digital to analog conversion, frequency up conversion, filtering, amplification and transmission to the communication network 419 (or networks) via the antenna 418.

In addition to processing communication signals, the DSP 420 provides for receiver 412 and transmitter 414 control. For example, gains applied to communication signals in the receiver 412 and transmitter 414 may be adaptively controlled through automatic gain control algorithms implemented in the DSP 420.

In a data communication mode, a received signal, such as a text message or web page download, is processed by the communication subsystem 411 and input to the processing device 438. The received signal is then further processed by the processing device 438 for output to a display 422, or alternatively to some other auxiliary I/O device 428. A device user may also compose data items, such as email messages, using a keyboard 438 and/or some other auxiliary I/O device 428, such as a touchpad, a rocker switch, a thumb-wheel, or some other type of input device. The composed data items may then be transmitted over the communication network 419 via the communication subsystem 411.

In a voice communication mode, overall operation of the device is substantially similar to the data communication mode, except that received signals are output to a speaker 434, and signals for transmission are generated by a microphone 436. Alternative voice or audio I/O subsystems, such as a voice message recording subsystem, may also be implemented on the device 400. In addition, the display 422 may also be utilized in voice communication mode, for example to display the identity of a calling party, the duration of a voice call, or other voice call related information.

The short-range communications subsystem 440 enables communication between the mobile communication device 400 and other proximate systems or devices, which need not necessarily be similar devices. For example, the short-range communications subsystem 440 may include an infrared device and associated circuits and components, or a Bluetooth™ communication module to provide for communication with similarly-enabled systems and devices.

The above-described embodiments of the present invention are intended to be examples only. Those of skill in the art may effect alterations, modifications and variations to the particular embodiments without departing from the scope of the invention.

The invention claimed is:

1. A communication device comprising:
    a database that stores
        (i) first configuration data and a first buddy list that correspond to a first instant messaging (IM) service and
        (ii) second configuration data and a second buddy list that correspond to a second IM service and that do not correspond to the first IM service;
    an input device configured to receive a selection of the first IM service and to receive a selection of the second IM service; and
    an IM application configured to, based on the configuration data,
        in response to the selection of the first IM service, display the first buddy list with an appearance that corresponds to a user interface associated with the first IM service and that does not correspond with a user interface associated with the second IM service; and
        in response to the selection of the second IM service, display the buddy list of the second IM service with an appearance that corresponds to a user interface associated with the second IM service and that does not correspond with a user interface associated with the first IM service.

2. The communication device of claim 1 wherein the IM application is configured to, based on the configuration data, use a lexicon that corresponds to an interface associated with the selected IM service and that does not correspond to an interface associated with the non-selected IM service.

3. The communication device of claim 2 wherein the IM application using the lexicon includes the application referring to the buddy list with terminology that is used by an interface associated with the selected IM service and is not used by an interface associated with the non-selected IM service.

4. The communication device of claim 2 wherein the IM application using the lexicon includes the application to describe a login procedure with terminology that is used by an interface associated with the selected IM service and is not used by an interface associated with the non-selected IM service.

5. The communication device of claim 2 wherein the application using the lexicon includes the application describing presence state information with terminology that is used by an interface associated with the selected IM service and that is not used by an interface associated with the non-selected IM service.

6. The communication device of claim 1 wherein the IM application is configured to, based on the configuration data, provide user functionality that corresponds to an interface associated with the selected IM service and that does not correspond to an interface associated with the non-selected IM service.

7. The communication device of claim 1 wherein the selection is through a display, of the communication device, that displays a first icon for selecting the first IM service and a second icon, with a different appearance than the first icon, for selecting the second IM service.

8. The communication device of claim 7 wherein the first icon includes graphic art associated with the first IM service, and the second icon includes graphic art associated with the second IM service.

9. The communication device of claim 7 wherein appearance of the first icon on the display is triggered by the communication device receiving a message from another communication device.

10. The communication device of claim 1 wherein the communication device is a mobile communication device.

11. A method comprising:
   storing, by a database of a communication device,
      (i) first configuration data and a first buddy list corresponding to a first instant messaging (IM) service and
      (ii) second configuration data and a second buddy list that correspond to a second IM service and that do not correspond to the first IM service;
   receiving, by a user interface of the communication device, a selection of the first IM service;
   in response to the selection of the first IM service, displaying, by an IM application of the communication device, the first buddy list with an appearance that corresponds to a user interface associated with the first IM service and that does not correspond with a user interface associated with the second IM service; and
   receiving, by the user interface of the communication device, a selection of the second IM service; and
   in response to the selection of the second IM service, displaying, by the IM application, the second buddy list with an appearance that corresponds to a user interface associated with the second IM service and that does not correspond with a user interface associated with the first IM service.

12. The method of claim 11 further comprising:
   using, by the IM application, based on the configuration data, a lexicon that corresponds to an interface associated with the selected IM service and that does not correspond to an interface associated with the non-selected IM service.

13. The method of claim 12 wherein the IM application using the lexicon includes the application referring to the buddy list with terminology that is used by an interface associated with the selected IM service and is not used by an interface associated with the non-selected IM service.

14. The method of claim 12 wherein the application using the lexicon includes the application describing a login procedure with terminology that is used by an interface associated with the selected IM service and is not used by an interface associated with the non-selected IM service.

15. The method of claim 12 wherein the application using the lexicon includes the application describing presence state information with terminology that is used by an interface associated with the selected IM service and that is not used by an interface associated with the non-selected IM service.

16. The method of claim 11 further comprising:
   providing, by the IM application, based on the configuration data, user functionality that corresponds to an interface associated with the selected IM service and that does not correspond to an interface associated with the non-selected IM service.

17. The method of claim 11 further comprising:
   displaying, by the communication device, a first icon for selecting the first IM service and a second icon, with a different appearance than the first icon, for selecting the second IM service.

18. A non-transitory processor readable medium storing a software instructions that are configured to be executed by a processor of a communication device to:
   store in a database of the communication device
      (i) first configuration data and a first buddy list corresponding to a first instant messaging (IM) service and
      (ii) second configuration data and a second buddy list that correspond to a second IM service and that do not correspond to the first IM service;
   receive, from a user interface of the communication device, a selection of the first IM service; and
   receive, from the user interface of the communication device, a selection of the second IM service;
   wherein the software instructions include a single IM application configured to:
      in response to the selection of the first IM service, display the first buddy list with an appearance that corresponds to a user interface associated with the first IM service and that does not correspond with a user interface associated with the second IM service; and
      in response to the selection of the second IM service, display the second buddy list with an appearance that corresponds to a user interface associated with the second IM service and that does not correspond with a user interface associated with the first IM service.

19. The processor readable medium of claim 18 wherein the IM application is configured to, based on the configuration data, use a lexicon that corresponds to an interface associated with the selected IM service and that does not correspond to an interface associated with the non-selected IM service.

20. The processor readable medium of claim 18 wherein the IM application is configured to, based on the configuration data, provide user functionality that corresponds to an interface associated with the selected IM service and that does not correspond to an interface associated with the non-selected IM service.

* * * * *